United States Patent Office 3,284,347
Patented Nov. 8, 1966

3,284,347
SOLVENT EXTRACTION OF HYDROCARBONS WITH HEXAFLUOROISOPROPYL AND TRI-FLUOROETHYL ALCOHOLS
David G. Hutton and William T. Robinson, Wilmington, Del., assignors to E. I. du Pont de Nemours and Company, Wilmington, Del., a corporation of Delaware
No Drawing. Filed Mar. 15, 1965, Ser. No. 439,957
11 Claims. (Cl. 208—333)

This invention relates to the separation or enrichment, by solvent extraction, of components of normally liquid hydrocarbon mixtures.

The partial or complete separation of various classes of normally liquid hydrocarbons has become of increased industrial importance in the petroleum industry and in the preparation of purified streams of starting materials for the production of elastomers, polymers, and plastics. The separation of liquid aromatic and olefinic components from their mixture with paraffinic hydrocarbons is of special importance in industry today. Many differing processes have been devised for separating such liquid hydrocarbon components, but more effective and more economical methods are always desired. Distillation and selective solvent processes have been most widely used for separating hydrocarbon mixtures. However, many hydrocarbon liquid mixtures obtained in commercial processes, such as those obtained from various petroleum refining processes, cannot be separated by fractional distillation techniques alone because of the narrow range through which the various components of the mixture distill. In such cases, selective solvent extraction, selective adsorption on solid adsorbents, and extractive distillation have been used to separate the components of close boiling mixtures. However, such methods have met with only varying degrees of success.

In a selective solvent extraction process, a solvent preferentially dissolves the hydrocarbons of one type to form a separable extract phase enriched in the more soluble hydrocarbons and a raffinate phase poorer in the more soluble hydrocarbons. A good selective solvent should, therefore, show a high degree of selectivity between hydrocarbons, should have a high solubility for hydrocarbons of the desired type, should be readily separable from the extract and raffinate phases, should be easily recoverable, and should be stable during repeated use.

Solvents which have been used heretofore as selective solvents for the extraction of aromatic and olefinic hydrocarbons from mixtures with other hydrocarbons include sulfur dioxide, furfural, diethylene glycol, and dimethylformamide. Each of these solvents, however, has one or more properties which destroys the proper balance of properties required for effective extractive solvents for certain applications. For example, each of the solvents used in present-day liquid-liquid extractions of hydrocarbons is either poorly selective, reactive with olefins, difficult to recover from the extract or raffinate phases, unstable with subsequent recycling or has an improper degree of solubility either for or in hydrocarbons in certain applications.

It is, therefore, an object of this invention to provide a process for the selective extraction of aromatic hydrocarbons from liquid mixtures thereof with saturated hydrocarbons.

It is another object of this invention to provide a process for the selective extraction of olefinic hydrocarbons from liquid mixtures thereof with saturated hydrocarbons.

It is a still further object of this invention to provide a process for the selective extraction of both aromatic and olefinic hydrocarbons from liquid mixtures thereof with saturated hydrocarbons.

These and other objects will become apparent hereinafter.

More specifically, the present invention is directed to a novel process for enriching the components of a normally liquid hydrocarbon mixtures which comprises (a) Contacting a liquid mixture of hydrocarbons comprising paraffinic, olefinic and/or aromatic components with a sufficient amount of a liquid alcohol having the formula $(CF_3)_n CH_{3-n} OH$, wherein $n$ is 1 or 2, to form a distinct liquid extract phase, and (b) Separating the liquid extract phase containing the olefinic and/or aromatic components from the raffinate phase containing the paraffinic components.

It was most surprising and unexpected that any fluorine-containing alcohol would be a selective solvent useful in separating or enriching components in a liquid mixture containing paraffinic, olefinic and aromatic components. This was especially the case when it is appreciated that, whereas alcohols were known to show a selectivity for aromatics over paraffins, fluorine-containing solvents were known to show the opposite selectivity; namely, that of selectively solubilizing the paraffins, olefins and naphthenic components away from the aromatics.

For example, alcohols, including isopropyl alcohol, have been used as selective solvents in refining lubricating oils and other hydrocarbon mixtures, generally extracting the more naphthenic and aromatic components from lubricating oils. Typical processes using such alcohols are described in U.S. Patents 1,825,762; 2,424,158; and 2,453,933. Halogenated alcohols have also been proposed as selective solvents for hydrocarbon separations. For example, U.S. Patent 2,072,104 discloses the use of ethylene chlorohydrin and epichlorohydrin to extract the more naphthenic and aromatic components from lubricating oils to increase viscosity index. The use of dibromohydrin (1,3-dibromo-2-propanol) is disclosed in U.S. Patent 2,161,753 for similar extractions.

On the other hand, fluorine-containing hydrocarbons and related compounds have also been proposed as selective solvents for refining lubricating oil and like liquid mixtures. Fluorine-containing solvents are known to extract the paraffinic or saturated components from their mixtures with olefins and aromatics. For example, dichlorodifluoromethane ("Freon-12") is disclosed in U.S. Patent 2,009,454 and U.S. Patent 2,140,485 as a dewaxing and deasphalting solvent for lubricating oils. A wide variety of chlorofluoro- and fluorohydrocarbons are disclosed as dewaxing and deasphalting solvents in U.S. Patent 2,163,564.

Perfluoro-hydrocarbon compounds have also been described as hydrocarbon extraction solvents. A process is described in U.S. Patent 2,582,197 for the use of a group of perfluorinated $C_7$ and $C_8$ hydrocarbons as extracting solvents for petroleum distillates in the gasoline and kerosene range. The process teaches that the perfluorinated hydrocarbons extract paraffinic, olefinic, and naphthenic components away from aromatic components. Another process is described in U.S. Patent 2,649,467 wherein perfluoro-hydrocarbons are used as extracting solvents. The perfluoro-hydrocarbons selectively solubilize the paraffinic compounds as illustrated by the fact that the extract was relatively rich in hydrogen and by the particular changes in physical properties of the extract in comparison to the initial mixture.

The fluorine-containing alcohols utilized in the present invention have the formula $(CF_3)_nCH_{3-n}OH$, wherein $n$ is either 1 or 2. More specifically, these alcohols are 2,2,2-trifluoroethyl alcohol, $CF_3CH_2OH$, and 1,1,1,3,3,3-hexafluoroisopropyl alcohol, $(CF_3)_2CHOH$.

Hexafluoroisopropyl alcohol is an unusually attractive solvent for use in the processes of this invention. Its preparation is described in Belgian Patent 634,368/63 and in an article in "Chemical and Engineering News," Nov. 30, 1964, pages 32 and 33. Hexafluoroisopropyl alcohol can be obtained by treatment of hexafluoroacetone with a reducing agent like lithium hydride or sodium borohydride in a suitable solvent or by hydrogenation of hexafluoroacetone over a catalyst like platinum. The resulting alcohol, which has the structure $$CF_3CH(OH)CF_3$$

can also be called hexafluoroisopropanol, 2,H-hexafluoro-2-propanol, or 1,1,1,3,3,3-hexafluoropropanol-2. Hexafluoroisopropyl alcohol is a water-white liquid which boils at 59° C. at 760 mm., melts at −1° C., and has a refractive index of below 1.3 at 20° C., a calculated critical temperature of 182° C., and a calculated heat of vaporization of about 90 B.t.u. per pound. It is miscible with water in all proportions and readily separated from non-aromatic hydrocarbons by extracting with water.

Trifluoroethyl alcohol also has physical properties which make it an attractive extraction solvent. This alcohol, which has the formula $CF_3CH_2OH$ and can be called 2,2,2-trifluoroethanol, boils at about 74° C. and has a specific gravity of 1.384 at 20° C. It is easily prepared by reduction of fluoral (trifluoroacetaldehyde) under appropriate conditions as described by Campbell et al., in the Journal of the American Chemical Society, vol. 72, pages 4380 ff. (1950). Trifluoroethyl alcohol is stable, relatively non-toxic, and soluble in water. Like hexafluoroisopropyl alcohol, it can be separated from hydrocarbons by extraction with water and by distillation.

Both hexafluoroisopropyl alcohol and trifluoroethyl alcohol possess a balance of properties which make them especially useful as extraction solvents for liquid hydrocarbon mixtures. Both alcohols possess ideal boiling points for extractive solvents. Trifluoroethyl alcohol (B.P. 74° C.) and hexafluoroisopropyl alcohol (B.P. 59° C.) are conveniently handled as liquids at room temperature. At the same time, both alcohols are readily distilled from water, since they both boil at a lower temperature than water. Being readily distilled from water is advantageous, since it eliminates the need to supply the high heat of vaporization required in the cases where water must be distilled from higher boiling solvents. This advantage is amply illustrated by a comparison of the heats of vaporization at atmospheric pressure. For instance, whereas hexafluoroisopropyl alcohol and trifluoroethyl alcohol have heats of vaporization of 90 B.t.u. and 155 B.t.u. per pound, respectively, water's heat of vaporization is 970 B.t.u. per pound.

The high specific gravity of both alcohols is another distinct advantage, since it aids in obtaining distinct phase separations during the extraction process. This high specific gravity is sufficient in some applications to eliminate the need for auxiliary solvents which are required in many solvent extraction systems to rearrange the density of distributions in order to obtain the desired phase separation. For example, the high specific gravity of hexafluoroisopropyl alcohol (1.59 at 25° C.) and trifluoroethyl alcohol (1.38 at 20° C.) makes it possible to use countercurrent extraction with reflux for the extraction of any hydrocarbon mixture. Many other solvents cannot be used in this manner due to their low specific gravity. For example, a mixture containing napthalene (sp. gr. 1.14 at 20° C.) cannot be refluxed against a solvent such as dimethylformamide (sp. gr. 1.12 at 20° C.) or furfural (sp. gr. 1.15 at 20° C.).

Another property of hexafluoroisopropyl and trifluoroethyl alcohols which makes their use in solvent extraction processes especially attractive is their high stability under conditions of extraction and recovery in continuous systems. Furthermore, both alcohols are essentially non-corrosive to common steels, non-flammable, and relatively non-toxic. The high solubility of both alcohols in water, together with the ease of distilling the alcohols from water, makes their recovery in extraction processes both convenient and economical.

Hexafluoroisopropyl alcohol and trifluoroethyl alcohol are utilized in the process of this invention to enrich or separate the components of normally liquid hydrocarbon mixtures. These normally liquid hydrocarbon mixtures usually include paraffinic, olefinic and aromatic components. The order of decreasing solubility of hydrocarbon types in hexafluoroisopropyl and trifluoroethyl alcohol has been found to be as follows: aromatics, unsaturates, saturates.

Saturated hydrocarbons include the paraffinic and branched-chain hydrocarbons of the formula $C_nH_{2n+2}$ and also cyclic hydrocarbons of the formula $C_nH_{2n}$. The olefinic hydrocarbons include compounds of carbon and hydrogen which contain one or more double bonds and which have the chemical reactions and physical properties typical of alkyl derivatives of ethylene. The aromatic hydrocarbons include the alkyl derivatives of benzene and naphthalene and other condensed-ring compounds with similar properties.

The fluoroalcohols of this invention have been found especially effective in extracting hydrocarbon components from certain specific mixtures. The solubilities of hydrocarbons in the fluoroalcohol solvents of this invention are increased by the presence in the hydrocarbon molecule of an olefinic or benzenoid group, and are decreased by increasing molecular weight and hydrocarbon chain length. Hence, the best separation exists where an olefin or aromatic is extracted from a paraffin of the same number of carbon atoms. As the chain length of the olefin becomes longer in respect to the paraffin from which it is to be separated, the separation abilities of the fluoroalcohols of this invention become less effective. The difference in chain length of the components in the mixture can best be defined in terms of the variance between the boiling points of the components, since boiling points directly reflect hydrocarbon chain length. Therefore, it has been found that the best and most preferred extractions using the fluoroalcohols of this invention are made on liquid mixtures where the olefinic and paraffinic components have boiling points within 70° C. of each other and where the aromatic and paraffinic components have boiling points within 220° C. of each other. Typical examples of liquid mixtures containing paraffinic, olefinic and aromatic components having boiling points for the various components within the above ranges are gasoline, various narrow and wide boiling jet fuels, and distillate fuel oils such as kerosene and heating oils. The distillation ranges of these petroleum hydrocarbon mixtures are set forth in the following table:

TABLE

| Fuel: | Distillation Range, °C.* |
|---|---|
| Gasoline, ASTM Spec. D-439 | 35-210 |
| Jet Fuel, ASTM Spec. D-1655 | 100-300 |
| Kerosene, ASTM Spec. D-396 | 200-260 |
| Diesel Fuel, ASTM Spec. D-795 | 175-400 |
| Distillate Fuel Oil, ASTM Spec. D-396 | 175-400 |

* Approximate values—small amounts will distill above and below these ranges

Such liquid mixtures are obtained in petroleum refining operations by distillation, by catalytic cracking, by hydrogenation, and by reforming and a variety of other processes. It is often desired to enrich or separate the aromatic, olefinic and paraffinic components of such mixtures to improve their stability or combustion properties.

If desired, the extraction processes of this invention can be combined with other known separation techniques to obtain more effective hydrocarbon separations. For instance, extraction with fluoroalcohol solvents can be combined with the azeotropic distillation to obtain more complete separations of hydrocarbons by structural type. In one such process, a gasoline is extracted with a fluoroalcohol solvent of this invention to obtain an extract enriched in olefinic and aromatic hydrocarbons. Distillation of this extract gives overhead azeotropes of the fluoroalcohol solvents with saturated and olefinic hydrocarbons and leaves behind a mixture further enriched in aromatic hydrocarbons.

The extraction processes of the present invention can be carried out in any way that is convenient or desirable. Single-stage, step-wise extractions can be used, but continuous processes will generally be preferred, with countercurrent flow of the solvent and the hydrocarbon mixture through extraction equipment of any efficient design. Various types of liquid-liquid extraction operations and suitable extraction equipment are described, for example, in "Chemical Engineer's Handbook" (McGraw-Hill Publishing Company, N.Y., 1950), pp. 716 ff. and 747 ff.

In general, the liquid-liquid extraction operation can be conducted with hexafluoroisopropyl or trifluoroethyl alcohols at any preferred condition chosen to obtain the most efficient separation. Two properties of a particular hydrocarbon-solvent combination are of particular importance in determining operating conditions. They are the solubility of the hydrocarbons in the solvent and the selectivity of the solvent for the desired hydrocarbon component. It is well known that the two properties are interrelated in that as hydrocarbon solubility is increased, selectivity for the desired hydrocarbon is decreased. Thus, the temperature of the extraction process is chosen by balancing the increased hydrocarbon solubility obtained at higher temperatures with the reduced solvent selectivity accompanying increased solubility. Generally, temperatures between 0° C. and 150° C. are useful for most extractions. Sufficient pressure is maintained within the extraction zone to prevent substantial volatilization of the charging stock of solvent under the liquid-liquid extraction conditions and it is obvious that pressure and temperature are related variables in the extraction process. Usually pressures within the ranges of 10 to about 150 p.s.i.a. are sufficient. Of course, neither temperature nor pressure are critical in the present process. The optimum temperature and pressure conditions for each separation are readily determined in each case by simple experimentation.

The ratio of solvent to feed stock, in liquid-liquid extractions, must be sufficient to exceed its solubilities under the extraction conditions in the feed stock in order to form two distinct phases, i.e., a raffinate phase containing little or no solvent, and an immiscible extract phase in which the extracted hydrocarbons are the solute. Generally, from about 0.1 to about 20 volumes of solvent are employed per volume of feed stock and preferably about 0.3–5 volumes of solvent per volume of feed stock are employed.

It may also be desired to employ diluents or co-solvents which are miscible in the fluoroalcohols of this invention in specific cases in order to modify the fluoroalcohol solvent selectivity and the hydrocarbon solubility in the fluoroalcohol solvent. One such diluent which modifies the selectivity and solubility characteristics of the fluoroalcohol solvents of this invention is water. As is well known in the art, water reduces the solubility of the hydrocarbons in most solvents while increasing the selectivity of the solvent. For this reason, water and solvents which act in a similar manner are known as anti-solvents. The same phenomenon is observed when water is mixed with the fluoroalcohols of the present invention. The amount of water in the solvent can be varied as desired to obtain optimum separations. With low-boiling saturated, olefinic, and aromatic hydrocarbon mixtures which are highly soluble in the fluoroalcohol solvents, as much as 25% by weight of water in the solvent may be desirable. Usually, however, less than 15% by weight of water will be preferred. With slightly higher-boiling hydrocarbon mixtures which are less soluble in the solvents, less than 5% added water will be preferred. In many hydrocarbon mixtures added water will reduce hydrocarbon solubility sufficiently to such an extent that extraction efficiency is destroyed. In such cases, anhydrous systems will be preferred. The extraction processes of this invention can also be operated at elevated temperatures with water added to the fluoroalcohol solvent as desired to obtain an optimum balance of solubility and selectivity. Other solvents, miscible with the fluoroalcohols of this invention, which increase instead of decrease the solubility of the hydrocarbon to be extracted in the solvent, are known as co-solvents. Many examples of such solvents are readily suggested to one skilled in liquid-liquid extraction processes.

The fluoroalcohol solvents of this invention can also be used in conjunction with an auxiliary solvent which, unlike the anti-solvent or co-solvent, is completely miscible with the hydrocarbon mixture instead of the fluoroalcohol solvent. Such solvents are easily separable from hydrocarbons and are used to obtain more effective separations. The auxiliary solvent, similar to the anti-solvent and co-solvent, modifies the solubility of the hydrocarbon to be extracted in the alcohol, thereby changing the alcohol's selectivity for the desired hydrocarbon. For instance, a higher-boiling hydrocarbon can be used as an auxiliary solvent along with hexafluoroisopropyl alcohol in the solvent extraction separation of a mixture of pentanes and pentenes or in the separation of benzene from other hydrocarbons. Similarly, a lower-boiling hydrocarbon auxiliary solvent can be used along with a fluoroalcohol in the solvent extraction separation of such high-boiling mixtures as lubricating oils.

The solubility of a hydrocarbon mixture in a solvent is usually expressed as the weight or volume fraction of the hydrocarbons in an extract layer obtained by mixing an excess of the hydrocarbon mixture with the solvent and separating the two phases obtained. High solubility is desired to reduce the amount of solvent and the number of extraction stages required to make a desired separation. High solubilities also reduce the size of extraction equipment, volumes of storage tanks, and size of solvent recovery systems required to obtain desired separations.

The selectivity of a single-stage solvent extraction involving a hydrocarbon mixture is usually expressed in terms of a selectivity coefficient or separation factor, $\beta$, which is calculated from the equation $$\beta = \frac{E_A}{R_A} \cdot \frac{R_B}{E_B}$$

wherein $E_A$ and $R_A$ are the amounts of component A in the extract and raffinate phases, respectively, and $R_B$ and $E_B$ are the amounts of component B in the raffinate and extract phases. Since these amounts are included in the equation as ratios, they can be expressed in any convenient terms and the selectivity coefficient, $\beta$, is a dimensionless number. The amounts of the components present can be expressed in terms of weight fractions, volume fractions, or mole fractions. They are conveniently expressed on a solvent-free basis.

The selectivity coefficient compares the relative concentrations of the two components of the mixture in the extract and raffinate phases. Thus, the ratio $E_A/R_A$ reflects the distribution of component A between the extract and raffinate phases and the ratio $R_B/E_B$ reflects the distribution of component B between the extract and raffinate phases. When the two distributions are the same, the value of $\beta$ is one and there is no separation. Higher or lower values of $\beta$ indicate separation. Beta values are conventionally expressed as numbers larger than one rather than as decimal fractions.

Theoretically, a solvent can be used to obtain a complete separation in which there is finite solubility and a selectivity factor, $\beta$, greater than one, but such separations may require unreasonable amounts of solvent when the solubility is low and impractical equipment when the selectivity is near one. Olefinic and paraffinic hydrocarbons are very similar in their properties and their separation is extremely difficult. Extraction solvent for olefin-paraffin mixtures which give selectivity coefficients, $\beta$, of 1.2 and above are uncommon and very few solvents give $\beta$ values above 1.5 for such systems. Aromatic and paraffinic hydrocarbons are less similar, so solvent extraction systems commonly have higher selectivity values. Selectivity coefficients, $\beta$, of 2.5 are not uncommon in such separations and values above about 5 are required for some commercial processes.

extract phases were then allowed to settle by gravity, and each phase separated. The solvent was then extracted from each phase with water.

Two analytical methods were used to determine the compositions of hydrocarbon mixtures in the raffinate and extract phases. One method was vapor phase chromatography, which separates and determines the amount of each compound in the mixture by sequential desorption. The other method was fluorescent indicator absorption procedure as described by ASTM method D–1319. This method separates more complicated hydrocarbon mixtures only into aromatic, olefinic, and paraffinic hydrocarbon classes by adsorption on silica gel, using fluorescent indicators to make the boundaries clearly visible under ultraviolet lights. The analytical results by such tests are reported as percent by volume.

*Example 1*

A gasoline was distilled to obtain a concentrate containing 92.5% of a mixture of $C_5$ paraffinic and olefinic hydrocarbons. This fraction was completely miscible with hexafluoroisopropyl alcohol. It was extracted in three 10 ml. portions with single 5 ml. portions of the alcohol to which were added 0.3, 0.4, and 0.5 ml. of water, equivalent to 3.6, 4.8, and 5.9% by weight water in the alcohol. Analyses of the feed, raffinates, and extracts determined by vapor phase chromatography, are given in Table I below. In all cases, the aqueous hexafluoroisopropyl alcohol was selective for the $C_5$ olefins over the $C_5$ paraffins, as shown by values of $\beta$ above 1 for the $C_5$ olefins. All the selectivity coefficients, $\beta$, were calculated with respect to n-pentane. The solubility of the extracted hydrocarbons in the alcohol containing 4.8% water was found to be 24% by weight.

TABLE I

*Extraction of various $C_5$ hydrocarbon components with hexafluoroisopropyl alcohol*

| $C_5$ Hydrocarbon | Boiling Pt., °C. | Vapor Phase Chromatograph Area,[1] Percent of Total | | | | | | | Selectivity Coefficient ($\beta$) | | |
|---|---|---|---|---|---|---|---|---|---|---|---|
| | | Feed | Raffinate | | | Extract | | | | | |
| Percent water in solvent | | | 3.6 | 4.8 | 5.9 | 3.6 | 4.8 | 5.9 | 3.6 | 4.8 | 5.9 |
| 2-methylbutane | 28 | 27.4 | 26.8 | 27.3 | 27.5 | 22.3 | 11.7 | 20.5 | 0.9 | 0.8 | 0.8 |
| 1-pentene | 30 | 7.5 | 6.9 | 6.9 | 6.8 | 7.4 | 4.3 | 7.8 | 1.2 | 1.2 | 1.3 |
| n-Pentane | 36 | 29.5 | 31.9 | 31.6 | 31.3 | 29.1 | 16.5 | 28.1 | | | |
| 2-pentene (trans) | 36 | 9.7 | 9.5 | 9.8 | 10.0 | 10.2 | 6.3 | 10.6 | 1.2 | 1.2 | 1.2 |
| 2-pentene (cis) and 2-methyl-2-butene | 37, 39 | 18.4 | 18.6 | 18.5 | 18.7 | 21.9 | 13.0 | 23.8 | 1.3 | 1.4 | ..5 |
| Total $C_5$ olefins | | 35.6 | 35.0 | 35.2 | 35.5 | 39.5 | 40.8 | 42.2 | | | |
| Total $C_5$ paraffins | | 56.9 | 58.7 | 58.9 | 58.8 | 51.4 | 49.2 | 48.6 | | | |
| Total Analysis [2] | | 92.5 | 93.7 | 94.1 | 94.3 | 90.9 | 90.0 | 90.8 | | | |

[1] Solvent-free basis.
[2] Remainder of hydrocarbons in mixtures were other $C_4$ and $C_6$ hydrocarbons.

Some low-boiling mixtures of olefinic and saturated hydrocarbons are completely miscible with fluoroalcohols at ordinary temperatures, so special procedures are required to obtain the two phases required for a solvent extraction process. The preferred procedure is addition of water or some other anti-solvent to reduce the solubilities of the hydrocarbons in the solvent. Other practical procedures to reduce hydrocarbon solubility and obtain phase separation include reducing the temperature of extraction and using an auxiliary solvent which is completely miscible with the hydrocarbon mixture but essentially insoluble in the fluoroalcohol.

Representative examples illustrating the present invention are as follows. In the following examples, the fluoroalcohols of this invention were contacted with various mixtures of hydrocarbons of diverse structural types until equilibrium was established. The liquid raffinate and extract phases were then allowed to settle by gravity, and each phase separated.

From the data in Table I, it can be seen that hexafluoroisopropyl alcohol shows a selective solubility for $C_5$ olefins over $C_5$ paraffins and that water increases the selectivity of the solvent for the olefinic components.

*Example 2*

To five different mixtures of n-heptane and 1-heptene were added sufficient quantities of hexafluoroisopropyl alcohol to effect distinct phase separation. The phases were then separated and analyzed. Analyses of the raffinates and extracts, determined by vapor phase chromatography, are given below in Table II together with selectivity coefficient, $\beta$, for 1-heptene and the percent solubility of hydrocarbons in the solvent for each extraction. The analyses of the raffinate and extract phases were on a solvent-free basis.

TABLE II

*Extraction of 1-heptene from n-heptane with hexafluoroisopropyl alcohol*

| Mixture | Fraction | Vapor Phase Chromatograph Area, Percent of Total | | | Selectivity Coefficient ($\beta$) | Solubility of Hydrocarbons in Alcohol, Percent |
|---|---|---|---|---|---|---|
| | | Hexafluoroiso-propyl Alcohol | N-heptane | 1-heptene | | |
| A | Raffinate | | 82.7 | 17.3 | 2.9 | 5 |
| | Feed (wt. percent) | 66.0 | 28.3 | 5.8 | | |
| | Extract | | 62.1 | 37.9 | | |
| B | Raffinate | | 86.6 | 13.4 | 2.9 | 5 |
| | Feed (wt. percent) | 60.8 | 32.6 | 6.7 | | |
| | Extract | | 68.8 | 31.2 | | |
| C | Raffinate | | 49.8 | 50.3 | 2.3 | 12 |
| | Feed (wt. percent) | 53.6 | 23.0 | 23.4 | | |
| | Extract | | 29.7 | 70.3 | | |
| D | Raffinate | | 61.3 | 38.7 | 2.1 | 8 |
| | Feed (wt. percent) | 53.7 | 28.8 | 17.6 | | |
| | Extract | | 43.5 | 56.5 | | |
| E | Raffinate | | 38.2 | 61.8 | 1.8 | 13 |
| | Feed (wt. percent) | 54.0 | 17.4 | 29.5 | | |
| | Extract | | 25.6 | 74.8 | | |

Example 3

To two different mixtures of n-heptane and 2-heptene were added sufficient quantities of hexafluoroisopropyl alcohol to effect distinct phase separations. The phases were then separated and analyzed. Analyses of the raffinates and extracts, determined by vapor phase chromatography, are given below in Table III, together with the selectivity coefficient, $\beta$, for the separation and the percent solubility of hydrocarbons in the solvent for each extraction. The analyses of the raffinate and extract phases were on a solvent-free basis.

Comparison of these results with those of Example 2 shows that hexafluoroisopropyl alcohol is able to extract 2-heptene as well as 1-heptene from n-heptane. Hence, whether the unsaturation is internal or terminal does not affect the ability of hexafluoroisopropyl alcohol to extract olefins from paraffins.

Example 4

Mixtures of one volume each of the paraffinic and olefinic hydrocarbons listed in Table IV below were extracted at about 25° C. with one volume of hexafluoroisopropyl alcohol and the extracts and raffinates were analyzed by vapor phase chromatography. The selectivity coefficients ($\beta$) for the separation of the components of these mixtures are given in Table IV.

TABLE III

*Extraction of 2-heptene from n-heptane with hexafluoro-isopropyl alcohol*

| Mixture | Fraction | Feed (wt. percent) | V.P. Chromatograph Area, percent of total | | Selectivity Factor ($\beta$) | Solubility of Hydrocarbon in Solvent, percent |
|---|---|---|---|---|---|---|
| | | | Raffinate | Extract | | |
| A | Hexafluoro-isopropyl | 53.5 | | | | |
| | n-Heptane | 22.9 | 52.0 | 36.3 | 1.9 | 11 |
| | 2-heptene | 23.6 | 48.0 | 63.7 | | |
| B | Hexafluoro-isopropyl | 62.3 | | | | |
| | n-Heptane | 26.7 | 71.2 | 46.6 | 2.8 | 7.5 |
| | 2-heptene | 11.0 | 28.8 | 53.4 | | |

TABLE IV

*Selectivity coefficients ($\beta$) for extracting olefinic from paraffinic hydrocarbons with hexafluoroisopropyl alcohol*

| Olefinic Hydrocarbon | Paraffinic Hydrocarbon | | |
|---|---|---|---|
| | n-Heptane (B.P., 98° C.) | Iso-octane (2,2,4-tri-methylpentane) (B.P., 99° C.) | Methylcylco-hexane (B.P., 100° C.) |
| 1-heptene (B.P., 93° C.) | 2.8 | 1.4 | 2.2 |
| 2-heptene (B.P., 98° C.) | 2.8 | 1.3 | 2.2 |
| 2,4,4-trimethyl-1-pentene (B.P., 101° C.) | 1.6 | 1.5 | 2.5 |
| 2,4,4-trimethyl-2-pentene (B.P., 105° C.) | 1.8 | 1.5 | 1.7 |
| 4-methylcyclohexene (B.P., 102° C.) | 2.2 | 1.9 | 2.2 |

Example 5

An olefinic gasoline mixture containing one part of a polymer gasoline (boiling range 39° C.–158° C.) and three parts of an alkylate was extracted with hexafluoroisopropyl alcohol at 25° C. in an eleven-stage Scheibel extractor one inch in diameter and four feet long. The gasoline feed was analyzed and found to contain 73.5% saturates, 25% olefins and 1.5% aromatics by the fluorescent absorption procedure of ASTM method D–1319–WT. The gasoline was fed at a rate of 7.4 ml. per minute countercurrent to hexafluoroisopropyl alcohol which was fed at 17.3 ml. per minute. The extractor was operated for 72 minutes before collecting samples of the products. Product samples were collected for 161 minutes. The raffinate layer was washed with water to obtain a hydrocarbon mixture which on analysis by the fluorescent procedure was found to contain 76.5% saturates, 21.5% olefins, and 2% aromatics. The extract layer from the first extraction was again extracted in the same Scheibel column with water and hexadecane as auxiliary solvents to assist in the separation of the extract and raffinate phases. After distilling the hexadecane from the extract phase of the second extraction, the phase was analyzed and found to contain a hydrocarbon mixture of 66% saturates, 30.5% olefins, and 3.5% aromatics.

From the above it can be seen that a significant degree of separation of olefinic and paraffinic hydrocarbon components of a relatively wide-boiling hydrocarbon mixture is possible according to the process of the present invention.

Example 6

The procedures of Example 2 were used to determine the selectivity of hexafluoroisopropyl alcohol in extracting 1-decene from n-decane and 1-hexadecene from n-hexadecane. The selectivity coefficient, $\beta$, based on separating the olefins from the paraffins at 25° C. and 50° C. were calculated and are given below in Table V.

TABLE V

*Separation factors for extracting olefinic from paraffinic hydrocarbons with hexafluoroisopropyl alcohol*

| Hydrocarbon Mixture | Separation Factors ($\beta$) | |
|---|---|---|
| | 25° C. | 50° C. |
| 1-decene/n-decane | 2.4 | 2.4 |
| 1-hexadecene/n-hexadecane | | 2.7 |

From the above, it can be seen that hexafluoroisopropyl alcohol is equally as effective in separating or enriching the components of high as well as low molecular weight olefinic and paraffinic hydrocarbon mixtures.

Example 7

Ten ml. of a mixture of one part n-heptane and one part 1-heptene was extracted with 10 ml. trifluoroethyl alcohol according to the procedure of Example 2 and the raffinate and extract layers were analyzed by vapor phase chromatography. A selectivity coefficient or separation factor, $\beta$, of 1.4 was calculated from the compositions of the components in the raffinate and extract phases.

Example 8

A mixture of n-heptane and 2-heptene was extracted with trifluoroethyl alcohol according to the procedures of Example 2. The raffinate and extract phases were analyzed by vapor phase chromatography and the results of the extraction are summarized in Table VI below.

TABLE VI

*Extraction of 2-heptene from n-heptane with trifluoroethyl alcohol*

| Components | Vapor Phase Chromatograph Area, Percent of Total | | Separation Factor ($\beta$) | Solubility of Hydrocarbon in Solvent, Percent |
|---|---|---|---|---|
| | Raffinate | Extract | | |
| Trifluoroethyl alcohol | 0.84 | 95.3 | 2.1 | 4.5 |
| n-Heptane | 83.9 | 3.2 | | |
| 2-heptene | 15.2 | 1.2 | | |

Example 9

A mixture of one volume each of cyclohexane and cyclohexene was extracted with one volume of trifluoroethyl alcohol and the raffinate and extract were analyzed by vapor phase chromatography. The separation factor, $\beta$, based on extracting the olefin from the paraffin, was calculated to be 2.0.

Example 10

A mixture of toluene and n-heptane was extracted with hexafluoroisopropyl alcohol according to the procedures of Example 2. Toluene was found to be completely immiscible in hexafluoroisopropyl alcohol. The data in Table VII are the results obtained from extractions when anhydrous hexafluoroisopropyl alcohol was used.

TABLE VII

*Extraction of toluene from n-heptane with hexafluoroisopropyl alcohol*

| Components | Feed (wt. Percent) | V.P. Chromatograph Area Percent of Total | | Separation Factor ($\beta$) | Solubility of Hydrocarbon in Solvent, Percent |
|---|---|---|---|---|---|
| | | Extract [1] | Raffinate [1] | | |
| Hexafluoroisopropyl Alcohol | 50.7 | | | 1.4 | 14 |
| n-Heptane | 21.7 | 64.3 | 71.7 | | |
| Toluene | 27.6 | 35.7 | 28.3 | | |

[1] Solvent-free basis.

From the data above, it can be appreciated that aromatic hydrocarbons are highly soluble in anhydrous hexafluoroisopropyl alcohol and that the anhydrous alcohol exhibits a relatively low selectivity for separating paraffinic and aromatic hydrocarbons. In order to increase the selectivity of hexafluoroisopropyl alcohol for toluene, it was necessary to add an anti-solvent such as water to the solvent. The anti-solvent, while increasing selectivity, also had the effect of reducing the solubility of toluene in hexafluoroisopropyl alcohol.

When the procedure of this example was repeated using an anti-solvent such as water to improve selectivity, the following solubility and separation factors ($\beta$) were found.

TABLE VIII

*Selectivity ($\beta$) values for mixtures of toluene and n-heptane extracted with hexafluoroisopropyl alcohol-water mixture*

| Amount of Water in Solvent (percent) | Solubility of Hydrocarbons in Solvent Mixture | Selectivity Values ($\beta$) |
|---|---|---|
| 3.2 | 16.5 | 5.9 |
| 4.8 | 12.0 | 11.9 |
| 6.5 | 7.5 | 17.1 |

Example 11

One volume of a full-boiling-range aromatic gasoline boiling from about 43° C. to about 203° C. was extracted with two volumes of hexafluoroisopropyl alcohol containing 4.2% water. A second portion of the gasoline was extracted with 2.5 volumes of the alcohol. The raffinate and extract layers were washed with water and then analyzed by the fluorescent indicator absorption method. From this analysis the selectivity coefficients ($\beta$) for the separations were calculated. The results of the separation are summarized in Table IX below.

TABLE IX

*Extraction of an aromatic gasoline with hexafluoroisopropyl alcohol containing 4.2% water*

|  | Percent of Total [1] | | | Slectivity Coefficients ($\beta$) |
|---|---|---|---|---|
|  | Feed | Raffinate | Extract |  |
| With 2.0 volumes solvent: |  |  |  |  |
|   Saturates | 61 | 76 | 50 | 3.5 |
|   Olefins | 2 | 3 | 2 |  |
|   Aromatics | 37 | 21 | 48 |  |
| With 2.5 volumes solvent: |  |  |  |  |
|   Saturates | 61 | 72 | 51.5 | 2.35 |
|   Olefins | 2 | 1.5 | 2 |  |
|   Aromatics | 37 | 26.5 | 46.5 |  |

[1] Solvent-free basis.

Example 12

The full-boiling range aromatic gasoline of Example 11 was extracted at 25° C. with hexafluoroisopropyl alcohol in a Scheibel extractor similar to that used in Example 5. The gasoline was introduced into the extractor at a rate of 11.4 ml. per minute countercurrent to the solvent which was introduced at a rate of 15.9 ml. per minute. After operating the column for 65 minutes, samples of the raffinate and extract were collected. The samples were collected for 227 minutes. The samples of the raffinate and extract were washed with water and analyzed by the fluorescent indicator absorption method. The results are shown in Table X below.

TABLE X

*Continuous extraction of an aromatic gasoline with hexafluoroisopropyl alcohol*

|  | Percent of Total [1] | | |
|---|---|---|---|
|  | Feed | Raffinate | Extract |
| Saturates | 61 | 91.5 | 49.5 |
| Olefins | 2 | 2 | 2.5 |
| Aromatics | 37 | 6.5 | 48.0 |
| Volume, relative | 100 | 27 | 73 |

[1] Solvent-free basis.

Example 13

Using the same extractor as in Example 5, a diesel fuel boiling between 204° C. and 330° C. was extracted at 25° C. with anhydrous hexafluoroisopropyl alcohol. The diesel fuel was fed to the bottom of the extractor at 5.9 ml. per minute, countercurrent to hexafluoroisopropyl alcohol at 15.3 ml. per minute. The extractor was run for 38 minutes before collecting samples from the raffinate and extract phases. The samples were collected for 115 minutes. A portion of the raffinate was distilled to a head temperature of 62° C. for solvent removal. A portion of the extract was distilled to a head temperature of 69° C. with nitrogen stripping near the end to facilitate removal of the solvent. Analyses by the fluorescent indicator absorption procedure of the feed, raffinate and extract are shown in Table XI below.

TABLE XI

*Continuous extraction of a diesel fuel with hexafluoroisopropyl alcohol*

|  | Percent of Total [1] | | |
|---|---|---|---|
|  | Feed | Raffinate | Extract |
| Saturates | 74 | 89.5 | 12 |
| Olefins | 3 | 2.5 | Trace |
| Aromatics | 23 | 8 | 88 |
| Volume, relative | 100 | 78 | 22 |

[1] Solvent-free basis.

In this extraction a 75% recovery of 88% pure aromatics was obtained, along with a raffinate which exhibited the improved properties as a diesel fuel summarized in Table XII below.

TABLE XII

*Effect of extraction with hexafluoroisopropyl alcohol on diesel fuel properties*

|  | Feed | Raffinate |
|---|---|---|
| Color, ASTM D-1500 | <2.5 | <1.5 |
| Sulfur, wt. percent | 0.17 | 0.054 |
| Pour Point, ° F., ASTM D-97 | −15 | −10 |
| Stability, 90 min., 300° F., Test Color, ASTM D-1500 | <7.5 | <2.5 |
| Blotter pad rating (0=clean, 20=very dark) | 20 | 8 |

The above results substantiate the effectiveness of a fluoroalcohol in extracting aromatic components from a higher-boiling hydrocarbon mixture and the improvement in quality of the products obtained from such extractions. The improved quality of the fuel is noted by the increased stability data (both on color rating and blotter pad rating) and by the reduced sulfur content of the extracted diesel fuel.

Example 14

A mixture of 2 ml. each of n-decane, decahydronaphthalene, n-butyl benzene, tetrahydronaphthalene, and methyl naphthalene was extracted with 10 ml. of hexafluoroisopropyl alcohol according to the procedure of Example 2. The analytical data for this extraction are summarized below in Table XIII.

TABLE XIII

*Extraction of a synthetic gas-oil mixture with hexafluoroisopropyl alcohol*

| Hydrocarbon | Weight Percent in Feed | Vapor Phase Chromatograph Area, Per Cent of Total | | Selectivity Coefficient ($\beta$) |
|---|---|---|---|---|
|  |  | Raffinate | Extract |  |
| n-Decane | 16.3 | 21.4 | 11.2 | 1.0 |
| Decahydronaphthalene | 20.0 | 23.1 | 11.2 | 0.9 |
| Tetrahydronaphthalene | 21.7 | 17.9 | 26.1 | 2.8 |
| n-Butyl benzene | 19.2 | 19.7 | 24.8 | 2.4 |
| Methylnaphthalene | 22.8 | 17.9 | 26.7 | 2.9 |

From the above, it can be seen that hexafluoroisopropyl alcohol is an effective solvent for the separation of high-boiling aromatic hydrocarbons from high-boiling saturated hydrocarbons.

Example 15

A mixture of one volume of benzene and one volume of cyclohexane was extracted with one volume of trifluoroethyl alcohol and the raffinate and extract layers were analyzed by vapor phase chromatography. The separation factor, $\beta$, for the separation was calculated to be 2.4.

Example 16

One volume of a mixture of n-heptane and toluene was extracted with one volume of trifluoroethyl alcohol according to the procedure of Example 2. Vapor phase chromatographic analysis gave the results shown in Table XIV.

TABLE XIV

*Extraction of a mixture of n-heptane and toluene with trifluoroethyl alcohol*

| | Vapor Phase Chromatograph Area, Percent of Total | | | Separation Factor ($\beta$) | Solubility of Hydrocarbon in Mixture, percent |
|---|---|---|---|---|---|
| | Raffinate | Feed[1] | Extract | | |
| Trifluoroethyl alcohol | 8.9 | | 76.1 | 3.2 | 23.9 |
| n-Heptane | 46.4 | 43.4 | 6.0 | | |
| Toluene | 44.6 | 46.6 | 17.9 | | |

[1] Solvent-free basis.

Example 17

A mixture containing 8 ml. of n-heptane and 2 ml. toluene was extracted with 5 ml. of trifluoroethyl alcohol according to the procedure of Example 2. The raffinate and extract phases were analyzed by vapor phase chromatography and the results of these analyses, together with the solubility of the hydrocarbons in the solvent and the separation factor, $\beta$, are summarized in Table XV below.

TABLE XV

*Extraction of an n-heptane-toluene mixture with trifluoroethyl alcohol*

| Components | Vapor Phase Chromatograph Area, Percent of Total | | | Separation Factor ($\beta$) | Solubility of Hydrocarbon in Solvent |
|---|---|---|---|---|---|
| | Feed, wt. percent | Raffinate | Extract | | |
| Trifluoroethyl alcohol | 49.0 | 1.1 | 90.6 | 8.0 | 9.4 |
| n-Heptane | 39.0 | 80.3 | 3.3 | | |
| Toluene | 12.0 | 18.5 | 6.1 | | |

In comparison with Example 16, it can be appreciated that the relative amounts of the various hydrocarbons in the mixture and the amount of the solvent used in the extraction can influence significantly the solubility of hydrocarbons in the extract phase and the selectivity coefficient ($\beta$) for the separation.

Example 18

Twenty-five ml. samples of five commercial jet fuels were each extracted five times with 12.5 ml. portions of hexafluoroisopropyl alcohol and after each extraction washed with 20 ml. portions of water. The original jet fuel as well as the jet fuel from the raffinate phase after the final extraction were analyzed by the fluorescent indicator absorption procedure of ASTM method D–1319–61T. The smoke points of the original and final extracted fuels were also determined by the ASTM method D–1132–59T. The data are summarized in Table XVI below. It can be seen that the hexafluoroisopropyl alcohol extracted the aromatic components from the jet fuels, enriching them in paraffinic components. This enriched paraffin concentration increased the jet fuel quality as reflected by the increase in smoke point. The smoke points of four of the fuels were raised from below to above the minimum specifications of 25 required in ASTM method D–1655–61T.

TABLE XVI

*Extraction of jet fuels with hexafluoroisopropyl alcohol*

| Sample | Jet Fuel Type[2] | Raffinate Recovered, vol. Percent | Hydrocarbon Type Analysis [1] | | | | | | Smoke Point | |
|---|---|---|---|---|---|---|---|---|---|---|
| | | | Before Extraction | | | After Extraction | | | Before Extraction | After Extraction |
| | | | Sat. | Arom. | Olef. | Sat. | Arom. | Olef. | | |
| A | A | 80.4 | 82.5 | 16.0 | 1.5 | 90.5 | 8.0 | 1.5 | 22.3 | 30.1 |
| B | B | 72.0 | 80.5 | 14.0 | 1.5 | 92.5 | 6.0 | 1.5 | 22.3 | 30.6 |
| C | B | 70.0 | 85.0 | 13.5 | 1.5 | 94.5 | 4.5 | 1.0 | 27.3 | 38.0 |
| D | A | 72.0 | 23.5 | 25.0 | 1.5 | 88.5 | 9.5 | 2.0 | 20.7 | 28.8 |
| E | B | 60.0 | 74.5 | 23.5 | 2.0 | 90.5 | 7.5 | 2.0 | 20.6 | 31.4 |

[1] Solvent-free basis.
[2] Jet Fuel Type A—narrow boiling (70° C.–290° C.).
Jet Fuel Type B—wide boiling (165° C.–330° C.).

It is to be understood that the preceding examples are representative and that said example may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for enriching the components of a normally liquid hydrocarbon mixture which comprises
   (a) contacting a liquid mixture of hydrocarbons comprising at least one paraffin component and at least one component selected from the group consisting of an olefin and an aromatic with a sufficient amount of a liquid alcohol to form a distinct extract phase, said alcohol having the formula $(CF_3)_nCH_{3-n}OH$, wherein $n$ is an integer from 1 to 2, and
   (b) separating said extract phase from said hydrocarbon mixture.

2. A process for enriching the components of a normally liquid hydrocarbon mixture which comprises
   (a) contacting a liquid mixture of hydrocarbons consisting essentially of at least one paraffin component and at least one olefin component, said paraffin and olefin components boiling within 70° C. of each other, with a sufficient amount of a liquid alcohol to form a distinct extract phase, said alcohol having the formula $(CF_3)_nCH_{3-n}OH$, wherein $n$ is an integer from 1 to 2, and (b) separating said extract phase from said hydrocarbon mixture.

3. A process for enriching the components of a normally liquid hydrocarbon mixture which comprises (a) contacting a liquid mixture of hydrocarbons comprising at least one paraffin component and at least one aromatic component, said paraffin and aromatic components boiling within 220° C. of each other, with a sufficient amount of a liquid alcohol to form a distinct extract phase, said alcohol having the formula $(CF_3)_nCH_{3-n}OH$, wherein $n$ is an integer from 1 to 2, and (b) separating said extract phase from said hydrocarbon mixture.

4. A process of improving a gasoline which comprises (a) contacting a gasoline with a sufficient amount of a liquid alcohol to form a distinct extract phase, said alcohol having the formula $(CF_3)_nCH_{3-n}OH$, wherein $n$ is an integer from 1 to 2, (b) separating said extract phase from said gasoline, and (c) removing entrained alcohol from the gasoline to obtain an improved gasoline mixture.

5. A process for improving a diesel fuel which comprises (a) contacting a diesel fuel with a sufficient amount of a liquid alcohol to form a distinct extract phase, said alcohol having the formula $(CF_3)_nCH_{3-n}OH$, wherein $n$ is an integer from 1 to 2, (b) separating said extract phase from said diesel fuel, and (c) removing entrained alcohol from the diesel fuel to obtain an improved diesel fuel mixture.

6. A process for improving a jet fuel which comprises (a) contacting a jet fuel with a sufficient amount of a liquid alcohol to form a distinct extract phase, said alcohol having the formula $(CF_3)_nCH_{3-n}OH$, wherein $n$ is an integer from 1 to 2, (b) separating said extract phase from said gasoline, and (c) removing the entrained alcohol from the gasoline to obtain an improved jet fuel mixture.

7. The process of claim 1 wherein the fluoroalcohol contains up to 25% by weight water.

8. The process of claim 1 wherein the alcohol is hexafluoroisopropyl alcohol.

9. The process of claim 2 wherein the alcohol is hexafluoroisopropyl alcohol.

10. The process of claim 3 wherein the alcohol is hexafluoroisopropyl alcohol.

11. The process of claim 3 wherein an aromatic rich extract is recovered.

No references cited.

DELBERT E. GANTZ, *Primary Examiner.*

H. LEVINE, *Assistant Examiner.*